(12) United States Patent
Kwon et al.

(10) Patent No.: US 8,823,912 B2
(45) Date of Patent: Sep. 2, 2014

(54) LIQUID CRYSTAL DISPLAY HAVING PARTICULAR PIXEL STRUCTURE

(75) Inventors: Oh Jeong Kwon, Hwaseong-si (KR); Jae Hong Park, Seoul (KR); Sung-Jae Yun, Hwaseong-si (KR); Shuai Jiang, Yongin-si (KR); Kyung Hye Park, Seongnam-si (KR); Joo Young Yoon, Seoul (KR); Hyeok Jin Lee, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 167 days.

(21) Appl. No.: 13/618,913

(22) Filed: Sep. 14, 2012

(65) Prior Publication Data

US 2013/0208225 A1 Aug. 15, 2013

(30) Foreign Application Priority Data

Feb. 9, 2012 (KR) .......................... 10-2012-0013140

(51) Int. Cl.
*G02F 1/1343* (2006.01)
*G02F 1/1337* (2006.01)

(52) U.S. Cl.
USPC ............ 349/144; 349/146; 349/143; 349/130

(58) Field of Classification Search
CPC .................... G02F 1/134336; G02F 1/133707; G02F 1/1393; G02F 2001/134305; G02F 2001/133742

USPC ................................... 349/144, 146, 143, 130
See application file for complete search history.

(56) References Cited

U.S. PATENT DOCUMENTS

| | | | |
|---|---|---|---|
| 6,342,938 B1 | 1/2002 | Song et al. | |
| 7,474,363 B2 * | 1/2009 | Kim et al. | 349/43 |
| 7,760,310 B2 | 7/2010 | Chen et al. | |
| 7,982,829 B2 | 7/2011 | Hanaoka et al. | |
| 8,035,787 B2 * | 10/2011 | Jung et al. | 349/141 |
| 8,045,112 B2 | 10/2011 | Lee et al. | |
| 8,098,358 B2 * | 1/2012 | Kim et al. | 349/141 |
| 8,314,913 B2 * | 11/2012 | Um et al. | 349/141 |
| 2009/0009449 A1 | 1/2009 | Uchida et al. | |
| 2010/0007833 A1 | 1/2010 | Kuo et al. | |
| 2010/0019998 A1 | 1/2010 | You et al. | |
| 2010/0157232 A1 | 6/2010 | Kim et al. | |
| 2010/0245222 A1 | 9/2010 | Cho et al. | |
| 2012/0281173 A1 | 11/2012 | Kwon et al. | |

FOREIGN PATENT DOCUMENTS

| | | |
|---|---|---|
| JP | 2004-037850 A | 2/2004 |
| JP | 2004-037854 A | 2/2004 |
| KR | 1020120124012 A | 11/2012 |

* cited by examiner

*Primary Examiner* — Mike Qi
(74) *Attorney, Agent, or Firm* — Innovation Counsel LLP

(57) ABSTRACT

A liquid crystal display includes a first substrate; and a pixel electrode including a first sub-pixel electrode and a second sub-pixel electrode formed at a distance from each other on the first substrate, the first sub-pixel electrode includes stem portions and a plurality of branch portions extended from the stem portions, and the second sub-pixel electrode surrounds the first sub-pixel electrode.

40 Claims, 16 Drawing Sheets

(a)

(b)

LIQUID CRYSTAL DISPLAY HAVING PARTICULAR PIXEL STRUCTURE

CROSS-REFERENCE TO RELATED APPLICATION

This application claims priority to and the benefit of Korean Patent Application No. 10-2012-0013140 filed in the Korean Intellectual Property Office on Feb. 9, 2012, the entire contents of which are incorporated herein by reference.

BACKGROUND OF THE INVENTION (a) Field of the Invention

The present invention relates to a liquid crystal display.

(b) Description of the Related Art

A liquid crystal display, which is one of the most common types of flat panel displays currently in use, includes two sheets of display panels with field generating electrodes, such as a pixel electrode and a common electrode, and a liquid crystal layer interposed therebetween. The liquid crystal display generates electric fields in the liquid crystal layer by applying voltage to the field generating electrodes, and determines the direction of liquid crystal molecules of the liquid crystal layer by the generated electric field, thus controlling polarization of incident light so as to display images.

Vertically aligned (VA) mode liquid crystal displays have been developed, in which the liquid crystal molecules are aligned so that a long axis thereof is vertical with respect to the plane of the display panel in a state where no electric field is applied.

In the vertically aligned (VA) mode liquid crystal display, it is important to ensure a wide viewing angle, and for this purpose, a method of forming a cutout, such as a micro-slit, on the field generating electrode is used. Cutouts and protrusions in the field generating electrode determine a tilt direction of liquid crystal molecules, such that a viewing angle may be increased by appropriately disposing the cutouts and protrusions to disperse the tilt direction of the liquid crystal molecule in various directions.

However, in the case of a method of providing a plurality of branch electrodes by forming a micro-slit on a pixel electrode, an open ratio of the liquid crystal display is decreased.

In addition, when a plurality of domains are formed in the liquid crystal layer by varying the inclination directions of liquid crystal molecules, display quality of a domain interface may be deteriorated.

The above information disclosed in this Background section is only for enhancement of understanding of the background of the invention and therefore it may contain information that does not form the prior art that is already known to a person of ordinary skill in the art.

SUMMARY OF THE INVENTION

A liquid crystal display is provided that can reduce a decrease of an aperture ratio of the liquid crystal display while having a wide viewing angle and a quick response speed, and prevent deterioration of display quality at a domain interface.

A liquid crystal display includes a first substrate; and a pixel electrode including a first sub-pixel electrode and a second sub-pixel electrode formed at a distance from each other on the first substrate, the first sub-pixel electrode includes stem portions and a plurality of branch portions extended from the stem portions, and the second sub-pixel electrode surrounds the first sub-pixel electrode.

The first sub-pixel electrode may include a plurality of sub-regions where the plurality of branch portions are extended in different directions.

The second sub-pixel may include a plurality of sub-regions disposed outside of the plurality of sub-regions of the first sub-pixel electrode.

The liquid crystal display may further include a second substrate facing the first substrate and a common electrode formed on the second substrate, and a voltage difference between the first sub-pixel electrode and the common electrode may be different from a voltage difference between the second sub-pixel electrode and the common electrode.

The voltage difference between the first sub-pixel electrode and the common electrode may be greater than the voltage difference between the second sub-pixel electrode and the common electrode.

The liquid crystal display may further include a liquid crystal layer injected between the first substrate and the second substrate and including a plurality of liquid crystal molecules, and, when no electric field is applied to the liquid crystal layer, the liquid crystal molecules may be arranged in a direction perpendicular to the surfaces of the first and second substrates.

The second sub-pixel electrode may include a cutout portion formed along an edge of the second sub-pixel electrode, the edge not being adjacent to the first sub-pixel electrode.

The first sub-pixel electrode may be disposed between the sub-regions of the second sub-pixel electrode, and the stem portion of the first sub-pixel electrode may be extended to the edge of the second sub-pixel electrode.

The first sub-pixel electrode and the second sub-pixel electrode may be spaced apart by a distance of about 1 μm to 8 μm.

The width of the plurality of branch portions of the first sub-pixel electrode and a distance between two adjacent branch portions among the plurality of branch portions may be about 1 μm to 10 μm.

The liquid crystal display may further include an alignment layer disposed on the first and second substrates, and the alignment layer may include a photosensitive material.

The liquid crystal display can form a plurality of domains without forming a cross-shaped cutout portion in a common electrode by dividing a pixel electrode disposed in one pixel area into a first pixel electrode and a second pixel electrode and having the first pixel electrode have a plurality of fine slits, and a cutout portion is formed along an edge of the pixel electrode so that an aperture ratio can be decreased compared to a liquid crystal display in which most of the pixel electrode has fine slits. In addition, the second pixel electrode is formed to surround the first pixel to prevent irregular movement of liquid crystal molecules disposed between two sub-pixels, and the cutout portion is formed along the edge of the second pixel electrode to reduce the influence of the fringe field formed at the edge of the second pixel electrode, thereby preventing deterioration of display quality of the edge of the pixel area.

DETAILED DESCRIPTION OF THE EMBODIMENTS

Figure 1:
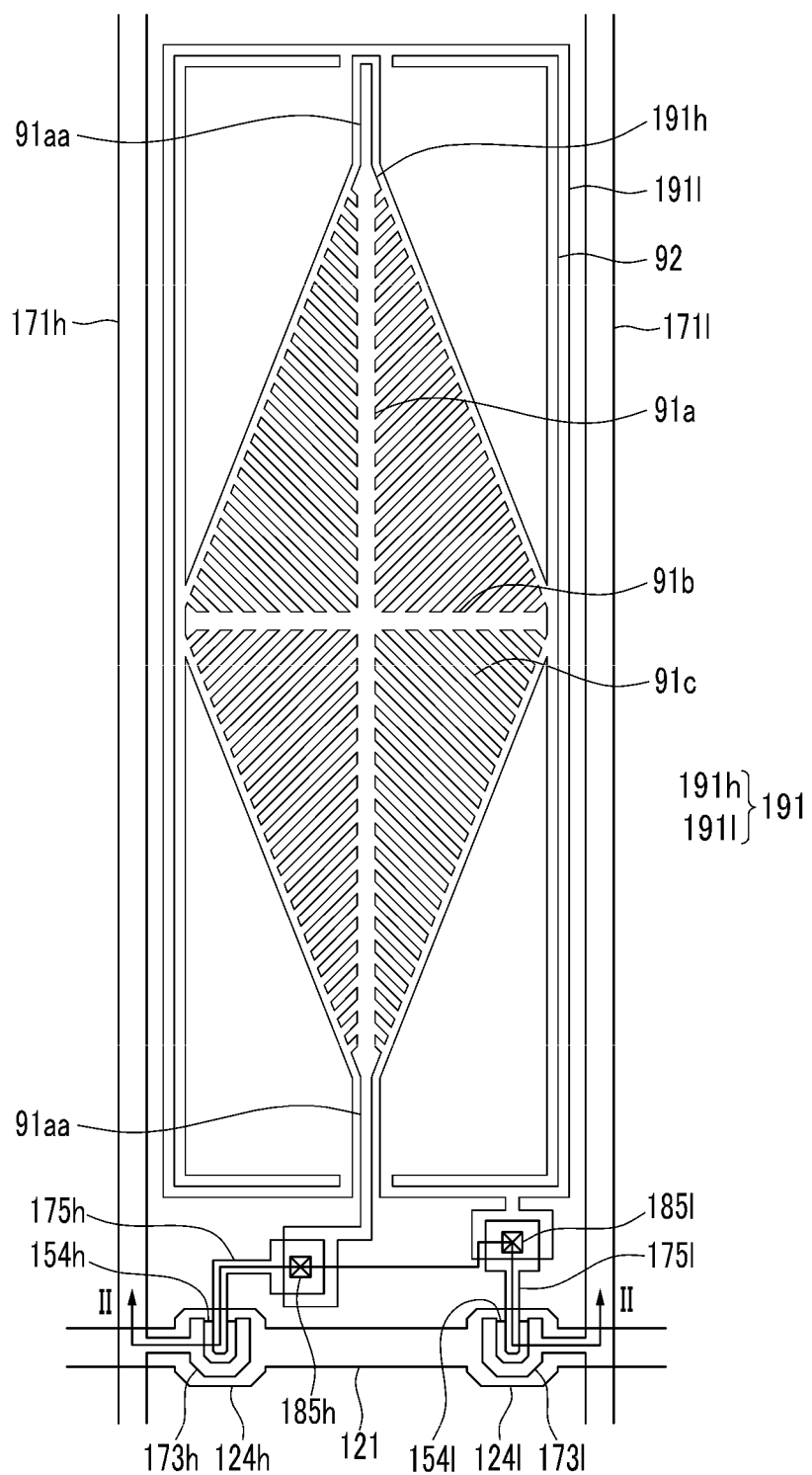
FIG. 1 is a layout view of a liquid crystal display according to an exemplary embodiment.

Example embodiments will be described more fully hereinafter with reference to the accompanying drawings, in which example embodiments are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element, or intervening elements may also be present. In contrast, when an element is referred to as being "directly on" another element, there are no intervening elements present.

Hereinafter, a display panel according to an exemplary embodiment will be described in further detail with reference to the accompanying drawings.

Figure 2:
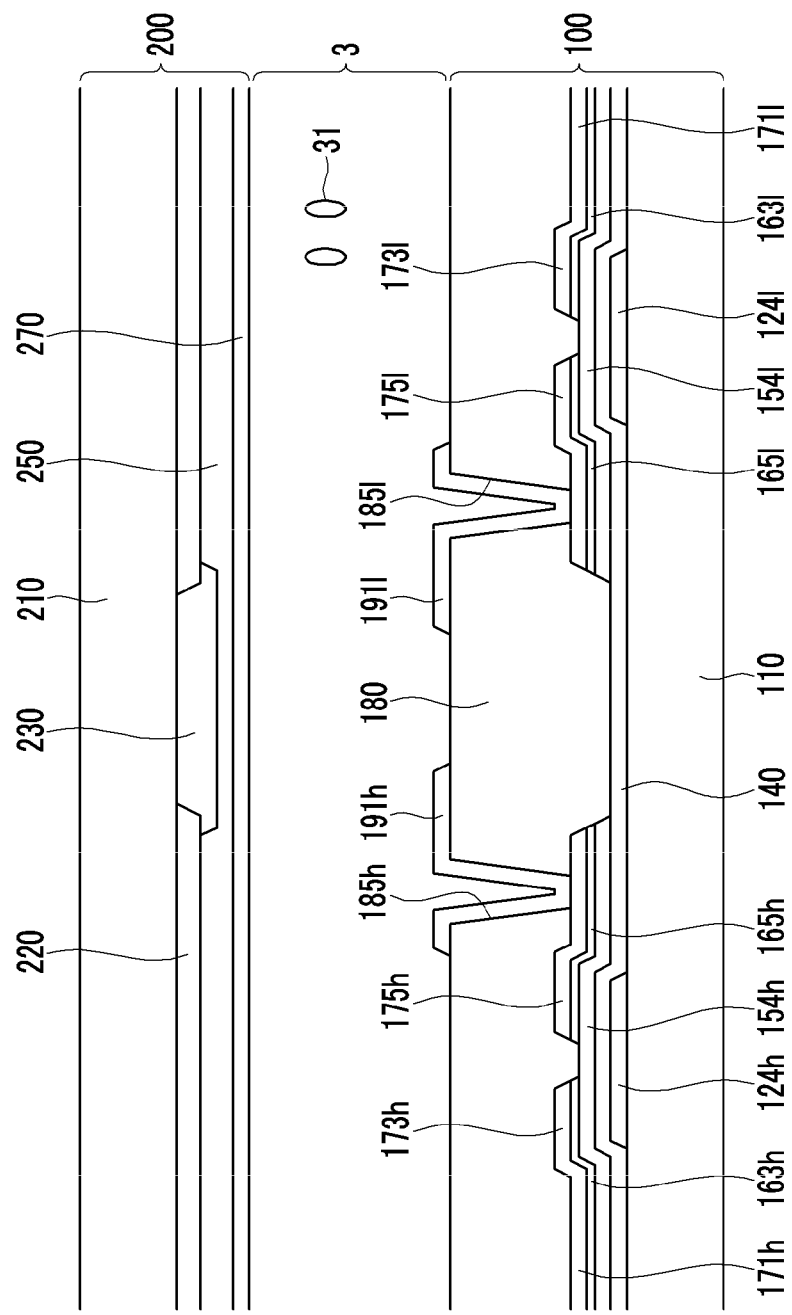
FIG. 2 is a cross-sectional view of the liquid crystal display of FIG. 1, taken along the line II-II.
Figure 3:
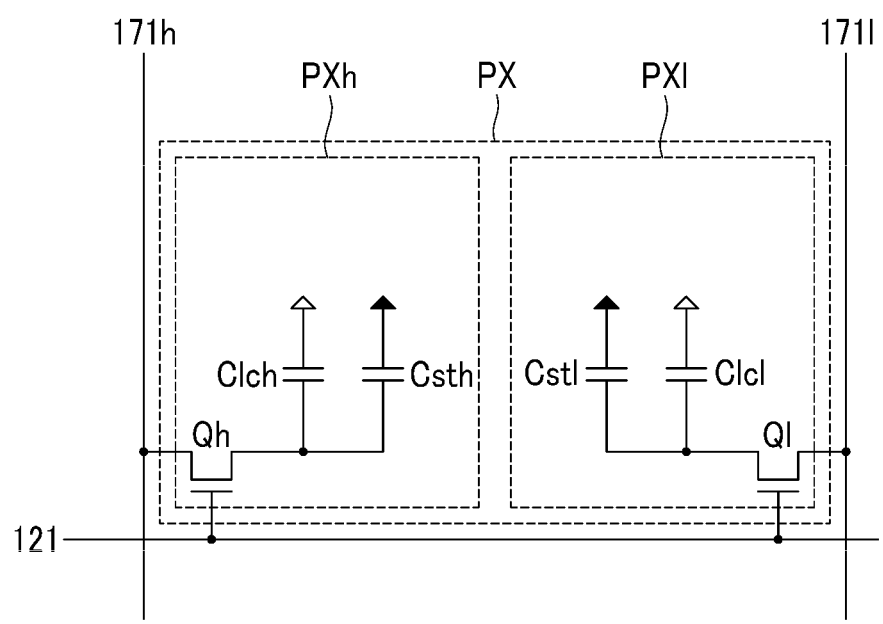
FIG. 3 is an equivalent circuit diagram of a pixel of the liquid crystal display according to an exemplary embodiment
Figure 4:
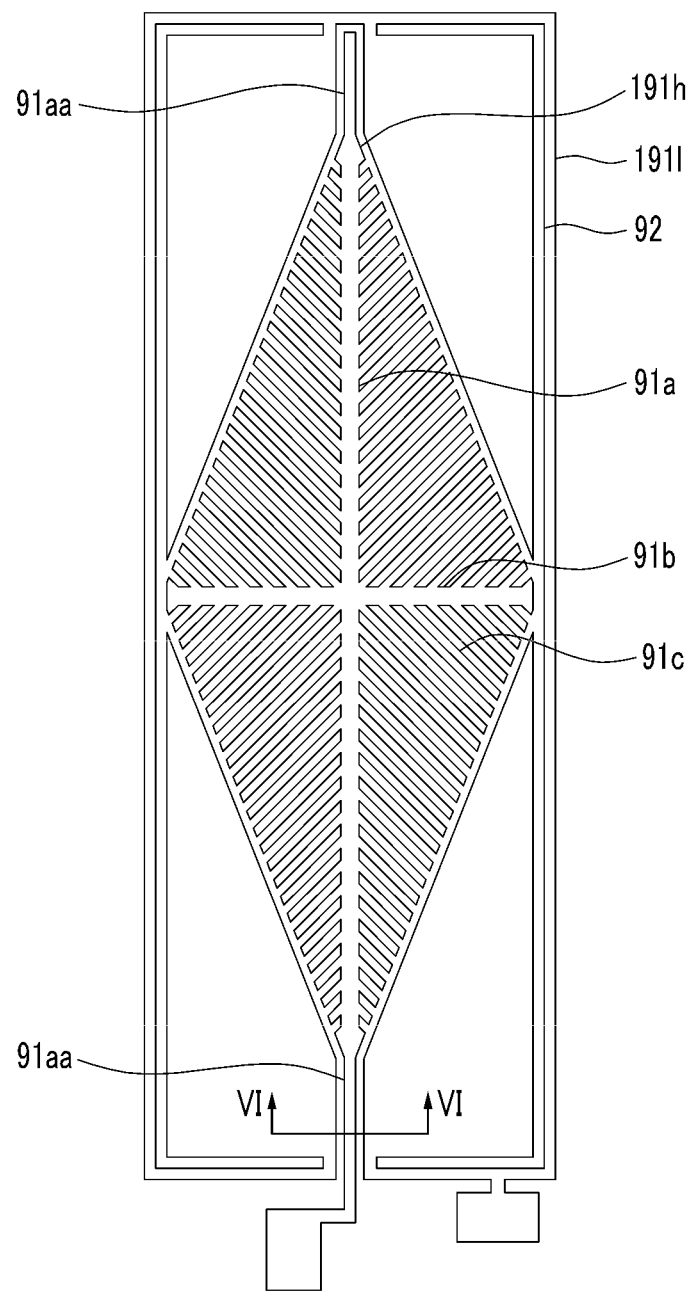
FIG. 4 is a top plan view of a basic region of a pixel electrode of the liquid crystal display according to the exemplary embodiment.

First, a liquid crystal display according to an exemplary embodiment of the present invention will be described with reference to FIG. 1 to FIG. 4. FIG. 1 is a layout view of a liquid crystal display according to an exemplary embodiment, FIG. 2 is a cross-sectional view of the liquid crystal display of FIG. 1 taken along the line II-II, FIG. 3 is an equivalent circuit diagram of a pixel of the liquid crystal display according to the exemplary embodiment, and FIG. 4 is a top plan view of a basic region of a pixel electrode of the liquid crystal display according to the exemplary embodiment.

Referring to FIG. 1 to FIG. 4, the liquid crystal display according to the present exemplary embodiment includes a lower panel 100, an upper panel 200, a liquid crystal layer 3 disposed between the two panels 100 and 200, and a pair of polarizers (not shown) attached to the outer sides of the panels 100 and 200. Here, the lower panel 100 and the upper panel 200 face each other.

First, the lower panel 100 will be described.

A plurality of gate lines 121 are formed on a first insulation substrate 110. Each gate line 121 mostly extends in a horizontal direction and transmits a gate signal. The gate line 121 includes a first gate electrode 124$h$ and a second gate electrode 124$l$, and the two gate electrodes 124$h$ and 124$l$ protrude outward from the gate lines 121 in FIG. 1.

Although it is not illustrated, a storage electrode line formed on the same layer as the gate line 121 may be further included, and the storage electrode line may include a plurality of storage electrodes.

A gate insulating layer 140 is formed on the gate line 121.

A plurality of semiconductors 154$h$ and 154$l$ formed of amorphous silicon or crystalline silicon are formed on the gate insulating layer 140. The semiconductors 154$h$ and 154$l$ include a first semiconductor 154$h$ extending toward the first gate electrode 124$h$ and a second semiconductor 154$l$ extending toward the second gate electrode 124$l$.

First and second ohmic contacts 163$h$ and 165$h$ are formed on the first semiconductor 154$h$, and third and fourth ohmic contacts 163$l$ and 165$l$ are formed on the second semiconductor 154$l$.

In a liquid crystal display according to another exemplary embodiment, the first and second semiconductors 154$h$ and 154$l$ may be oxide semiconductors, and in this case, the ohmic contacts 163$h$, 165$h$, 163$l$, and 165$l$ can be omitted.

A first data line 171$h$ including a first source electrode 173$h$ and a first drain electrode 175$h$ are formed on the first and second ohmic contacts 163$h$ and 165$h$, and a second data line 171$l$ including a second source electrode 173$l$ and a second drain electrode 175$l$ are formed on the third and fourth ohmic contacts 163$l$ and 165$l$.

The first gate electrode 124$h$, the first source electrode 173$h$, and the first drain electrode 175$h$ form a thin film transistor (TFT) Qh together with the first semiconductor 154$h$, and a channel of the first thin film transistor Qh is formed in the first semiconductor 154$h$ between the first source electrode 173$h$ and the first drain electrode 175$h$.

Similarly, the second gate electrode 124$l$, the second source electrode 173$l$, and the second drain electrode 175$l$ form a second thin film transistor Ql together with the second semiconductor 154$l$, and a channel of the second thin film transistor Ql is formed in the second semiconductor 154$l$ between the second source electrode 173$l$ and the second drain electrode 175$l$.

The semiconductors 154$h$ and 154$l$ may have substantially the same shape in a planar view as the data lines 171$h$ and 171$l$ and the drain electrodes 175$h$ and 175$l$, excluding channels between the source electrodes 173$h$ and 173$l$ and the drain electrodes 175$h$ and 175$l$. That is, portions of semiconductors 154$h$ and 154$l$ between the source electrodes 173$h$ and 173$l$ and the drain electrodes 175$h$ and 175$l$ and portions exposed rather than blocked by the data lines 171$h$ and 171$l$ and the drain electrode 175$h$ and 175$l$ exist in the semiconductors 154$h$ and 154$l$.

A passivation layer 180 is formed on the data lines 171$h$ and 171$l$, the drain electrodes 175$h$ and 175$l$, and the exposed semiconductors 154$h$ and 154$l$. The passivation layer 180 is formed of an inorganic insulator or an organic insulator, and may have a flat surface. The inorganic insulator includes, for example, silicon nitride and silicon oxide. The organic insulator may have photosensitivity, and preferably has a dielectric constant of about less than 4.0. However, the passivation layer 180 may have a double-layered structure of a lower inorganic layer and an upper organic layer in order to prevent a portion of the exposed semiconductors 151h and 151l from being damaged while maintaining an excellent insulation feature.

In a liquid crystal display according to another exemplary embodiment, the passivation layer 180 may include an organic layer, and in this case, the passivation layer 180 may be a color filter. When the passivation layer 180 is a color filter, a color filter 230 and a light blocking member 220 of an upper panel 200 are instead disposed in the lower panel 100, so that the color filter 230 and the light blocking member 220 may be omitted from the upper panel 200.

A plurality of pixel electrodes 191 are formed on the passivation layer 180. Each pixel electrode 191 includes a first sub-pixel electrode 191h and a second sub-pixel electrode 191l.

The overall shape of the first sub-pixel electrode 191h is a rhombus, and includes a vertical stem portion 91a and a horizontal stem portion 91b connected with each other, and a fine branch portion 91c extended from the two stem portions 91a and 91b. The two stem portions 91a and 91b and the fine branch portion 91c are formed in a central portion of the first sub-pixel electrode 191h. The first sub-pixel electrode 191h is divided into a plurality of sub-regions with reference to a direction in which the fine branch portion 91c is extended, with the stem portions 91a and 91b as a boundary. In further detail, the first sub-pixel electrode 191h of the liquid crystal display according to the present exemplary embodiment is divided into four sub-regions. The fine branch portion 91c is extended outward from the stem portions 91a and 91b in different directions in the four sub-regions.

The fine branch portion 91c forms an angle of about 45 degrees or 135 degrees with the gate line 121 or the horizontal stem portion 91b. In addition, the directions the fine branch portions 91c in two neighboring sub-regions extend may perpendicularly cross each other.

The width of each individual branch in the fine branch portion 91c and a distance between two neighboring fine branches 91c may be about 1 μm to 10 μm.

The second sub-pixel electrode 191l surrounds the first sub-pixel electrode 191h, and includes a plurality of sub-regions arranged along the four sides of the rhombus-shaped first sub-pixel electrode 191h. The second sub-pixel electrode 191l may be divided into a plurality of sub-regions by separated portions between the first sub-pixel electrode 191h and the second sub-pixel electrode 191l on one side and the edge of the second sub-pixel electrode 191l on the other. In further detail, the second sub-pixel electrode 191l of the liquid crystal display according to the present exemplary embodiment is divided into four sub-regions.

A cutout 92 is formed in the outer edges of the respective sub-regions of the second sub-pixel electrode 191l.

An end portion 91aa of the vertical stem portion 91a of the first sub-pixel electrode 191h is extended to a portion where the second sub-pixel electrode 191l is disposed between two adjacent subregions of the second sub-pixel electrode 191l.

The first sub-pixel electrode 191h and the second sub-pixel electrode 191l are separated by a constant distance, and the distance may be about 1 μm to 8 μm.

The entire figure of the pixel electrode 191 including the first sub-pixel electrode 191h and the second sub-pixel electrode 191l is a quadrangle.

The first sub-pixel electrode 191h and the second sub-pixel electrode 191l respectively receive data voltages from the first drain electrode 175h and the second drain electrode 175, through, respectively, the first contact hole 185h and the second contact hole 185l. The first sub-pixel electrode 191h and the second sub-pixel electrode 191l to which the data voltages are applied generate an electric field together with common electrode 270 of the upper panel 200 to determine the directions the liquid crystal molecules 31 of the liquid crystal layer 3 between the two electrodes 191 and 270 are oriented. Luminance of light passing through the liquid crystal layer 3 is changed according to the orientation direction of the liquid crystal molecules.

The first sub-pixel electrode 191h and the common electrode 270 form a first liquid crystal capacitor Clch (FIG. 3) together with the liquid crystal layer 3 therebetween. The second sub-pixel electrode 191l and the common electrode 270 form a second liquid crystal capacitor Clcl together with the liquid crystal layer 3 therebetween. Thus, CLch and Clcl allow the applied voltages to be maintained after the first and second thin film transistors Qh and Ql are turned off.

The first and second sub-pixel electrodes 191h and 191l overlap a storage electrode (not shown) and a storage electrode line (not shown) such that first and second storage capacitors Csth and Cstl are formed, and the first and second storage capacitors Csth and Cstl reinforce the voltage storage capability of each of the first and second liquid crystal capacitors Clch and Clcl.

A first sub-pixel area PXh, where the first sub-pixel electrode 191h is disposed, and a second sub-pixel area PXl, where the second sub-pixel electrode 191l is disposed, form one pixel area PX.

A lower alignment layer (not shown) maybe disposed on the first sub-pixel electrode 191h and the second sub-pixel electrode 191l. The lower alignment layer may be a vertical alignment layer and may include a photo-sensitive material.

Next, the upper panel 200 will be described.

A light blocking member 220 is formed on a second insulation substrate 210. The light blocking member 220 is also referred to as a black matrix and prevents light leakage.

A plurality of color filters 230 are formed on the substrate 210 and the light blocking member 220. Each color filter 230 is disposed mostly in a region surrounded by the light blocking member 220 and may be extended along a pixel column including a plurality of pixels arranged in a column direction. Each color filter 230 may include one of three primary colors of red, green, and blue. Alternatively, each color filter 230 may display the primary colors of yellow, cyan, magenta, and the like, or may display a plurality of colors other than these primary colors.

As discussed above, at least one of the light blocking member 220 and the color filter 230 may be formed on the lower panel 100.

An overcoat 250 is formed on the color filter 230 and the light blocking member 220. The overcoat 250 may be made of an (organic) insulator and prevents the color filter 230 from being exposed and provides a flat surface. The overcoat 250 may be omitted.

A common electrode 270 is formed on the overcoat 250.

An upper alignment layer (not shown) may be formed on the common electrode 270. The upper alignment layer may be a vertical alignment layer, and may include a photo-sensitive material.

Polarizers (not shown) may be provided on the outer surfaces of the panels 100 and 200, and it is preferable that transmissive axes of the two polarizers may be orthogonal to each other and that one transmissive axis of the axes is parallel to the gate line 121. However, the polarizer may be disposed on only an outer surface of one of the two panels 100 and 200.

The liquid crystal layer 3 includes liquid crystal molecules 31 having negative dielectric anisotropy. The liquid crystal layer 3 may include polymers. The liquid crystal molecules 31 may be aligned so that long axes thereof is vertical (approximately perpendicular) with respect to the surface of the two display panels 100 and 200 in a state in which there is no electric field. The liquid crystal molecules 31 may be initially arranged to have a pretilt such that long axes of the liquid crystal molecules 31 are arranged in different directions in four sub-regions of the respective sub-pixel electrodes 191h and 191l by the fine branch portion 91c of the first sub-pixel electrode 191h and the edge of the second sub-pixel electrode 191l. Thus, each of the first and second sub-pixels has four sub-regions of which pretilt directions of liquid crystals are different from each other. Accordingly, incident light cannot pass through a crossed polarizer and is thus blocked in a state in which there is no electric field.

As described above, the first sub-pixel electrode 191h and the second sub-pixel electrode 191l respectively applied with the data voltage generate the electric field together with the common electrode 270 of the common electrode panel 200. The electric field causes the liquid crystal molecules 31 of the liquid crystal layer 3, which are aligned so as to be vertical to the surfaces of the two electrodes 191 and 270 while the electric field is not applied, to be inclined in a horizontal direction to the surfaces of the two electrodes 191 and 270. The luminance of the light transmitting through the liquid crystal layer 3 varies according to the degree of inclination of the liquid crystal molecules.

The first sub-pixel electrode 191h and the second sub-pixel electrode 191l may receive different data voltages by being connected with different data lines 171h and 171l. Thus, voltages charged in the two liquid crystal capacitors Clch and Clcl may be slightly different from each other. For example, a data voltage applied to the liquid crystal capacitor Clch is set to be higher than a data voltage applied to the liquid crystal capacitor Clcl. In this case, the charged voltages of the two liquid crystal capacitors Clch and Clcl represent different gamma curves, and a gamma curve of one pixel voltage is a curve obtained by combining the different gamma curves. The combined gamma curve for the view from the front of the display is in accordance with a reference gamma curve in the front determined to be most suitable, and the combined gamma curve for the view from the side of the display is the closest to the reference gamma curve in the front. As described above, side visibility is improved by the combined gamma curve.

Referring to FIG. 4, a basic region of a pixel electrode of the liquid crystal display according to an exemplary embodiment will now be described.

As shown in FIG. 4, a pixel electrode 191 includes a first sub-pixel electrode 191h and a second sub-pixel electrode 191l.

The overall shape of the first sub-pixel electrode 191h is a rhombus, and includes a vertical stem portion 91a, a horizontal stem portion 91b, and a fine branch portion 91c extended from the two stem portions 91a and 91b. The vertical and horizontal stem portions 91a and 91b are connected with each other, and the two stem portions 91a and 91b and the fine branch portion 91c are formed in a central portion of the first sub-pixel electrode 191h. The first sub-pixel electrode 191h is divided into a plurality of sub-regions with reference to a direction in which the fine branch portion 91c is extended, with the stem portions 91a and 91b as a boundary. In further detail, the first sub-pixel electrode 191h is divided into four sub-regions. The fine branch portion 91c is extended in different directions in the four sub-regions. The width of each individual branch in the fine branch portion 91c and a distance between two neighboring fine branches 91c may be about 1 μm to 10 μm.

The second sub-pixel electrode 191l surrounds the first sub-pixel electrode 191h, and includes a plurality of sub-regions arranged along the four sides of the rhombus-shaped first sub-pixel electrode 191h. The second sub-pixel electrode 191l may be divided into a plurality of sub-regions by an edge thereof facing the first sub-pixel electrode 191h and an edge disposed in an outer edge of the pixel electrode 191. In further detail, the second sub-pixel electrode 191l of the liquid crystal display according to the present exemplary embodiment is divided into four sub-regions. A cutout 92 is formed in the outer edges of the respective sub-regions of the second sub-pixel electrode 191l.

An end portion 91aa of the vertical stem portion 91a of the first sub-pixel electrode 191h is extended to a portion where the second sub-pixel electrode 191l is disposed between two adjacent sub-regions of the second sub-pixel electrode.

The first sub-pixel electrode 191h and the second sub-pixel electrode 191l are separated by a constant distance, and the distance may be about 1 μm to 8 μm. An electric field of the second sub-pixel electrode 191l may be influenced at the edge of the second sub-pixel electrode 191l by controlling a distance between the first sub-pixel electrode 191h and the second sub-pixel electrode 191l, such that deterioration of transmittance due to the distance can be prevented.

The overall shape of the pixel electrode 191 including the first sub-pixel electrode 191h and the second sub-pixel electrode 191l is a quadrangle.

As previously described, a liquid crystal layer 3 disposed between the lower panel 100 and the upper panel 200 includes liquid crystal molecules 31 having negative dielectric anisotropy, and may further include polymers.

Figure 5:
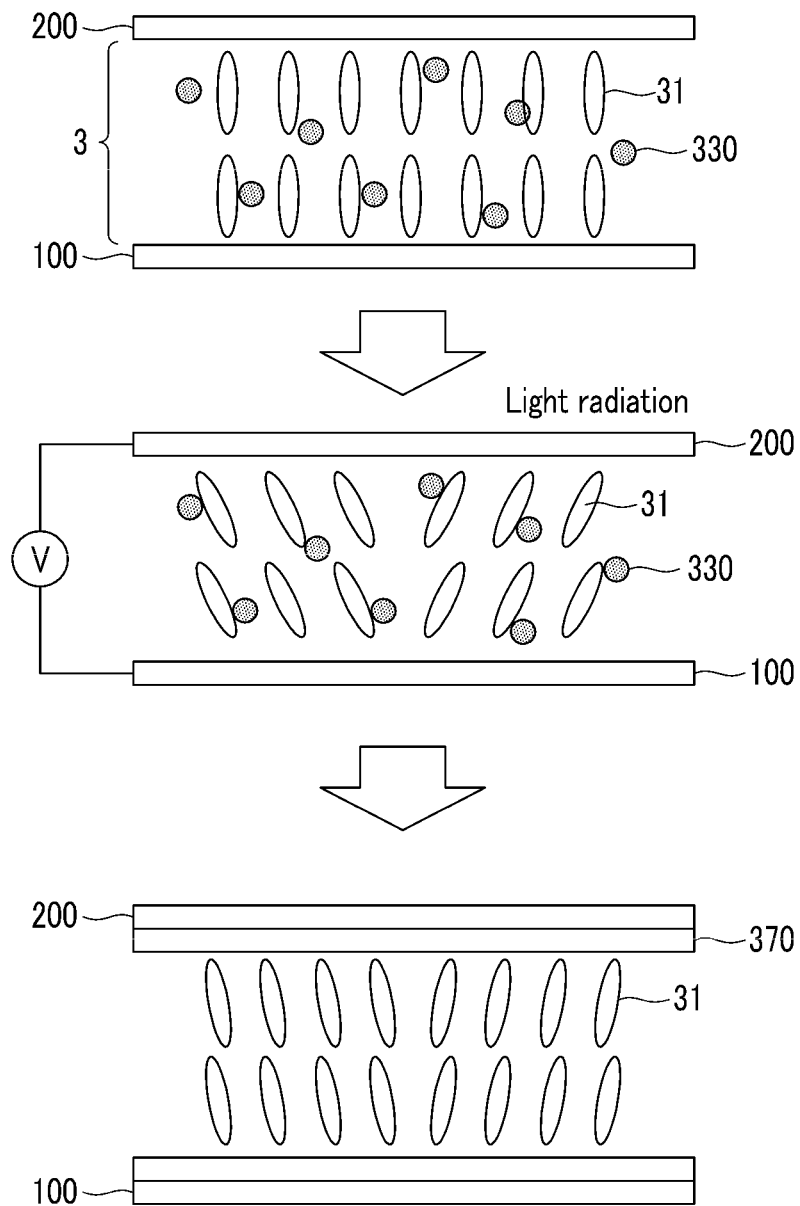
FIG. 5 shows a view illustrating a process for allowing liquid crystal molecules to have a pretilt by using a prepolymer polymerized by light such as ultraviolet rays.

Now, a method for initially aligning the liquid crystal molecules 31 so that they have a pretilt will be described with reference to FIG. 5. FIG. 5 shows a process for aligning the liquid crystal molecules with pretilts using prepolymers that are polymerized by light such as ultraviolet rays.

First (at the top of FIG. 5), a prepolymer 330, such as a monomer, that is hardened by polymerization due to light, such as ultraviolet rays, is injected between the two display panels 100 and 200, together with a liquid crystal material. The prepolymer 330 may be a reactive mesogen that is polymerized by light such as ultraviolet rays.

Next, a data voltage is applied to the first and second sub-pixel electrodes 191h and 191l and a common voltage is applied to the common electrode 270 of the upper panel 200 such that an electric field is generated in the liquid crystal layer 3 between the two display panels 100 and 200. Then, responding to the electric field, the liquid crystal molecules 31 of the liquid crystal layer 3 are inclined in four directions with respect to the stem portions 91a and 91b and the plurality of branch portions 91c of the first sub-pixel electrode 191h, the edge of the second sub-pixel electrode 191l, and a fringe field of the common electrode 270.

When the electric field is formed in the liquid crystal layer 3 and it is irradiated with light, such as ultraviolet rays, the prepolymer 330 is polymerized, thereby forming a polymer 370. The polymer 370 is formed to contact the display panels 100 and 200. The liquid crystal molecules 31 are aligned so that they are inclined, or pretilted, in the alignment direction determined by the polymer 370 when there is no voltage applied and thus no electric field across the liquid crystal layer. Accordingly, the liquid crystal molecules 31 are aligned with pretilts in four different directions even though no voltage is applied to the field generating electrodes 191 and 270.

Figure 6:
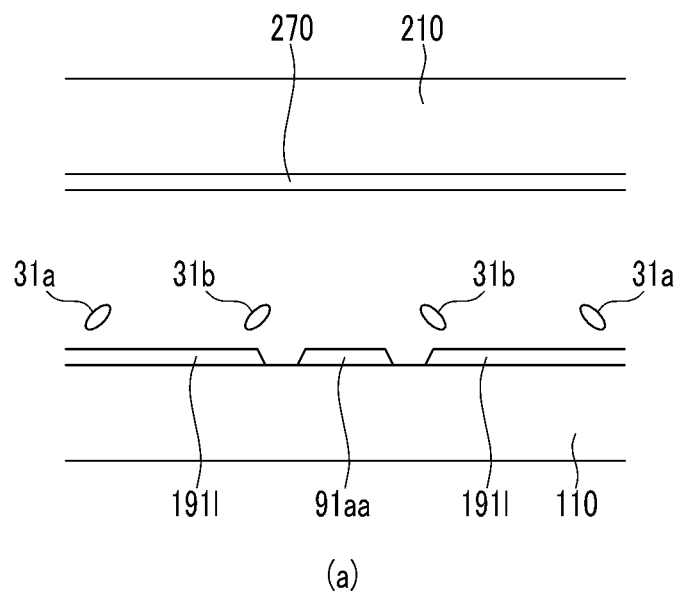
FIG. 6 is a schematic view of an alignment direction of a director of a liquid crystal molecule of the liquid crystal display according to an exemplary embodiment.
Figure 6:
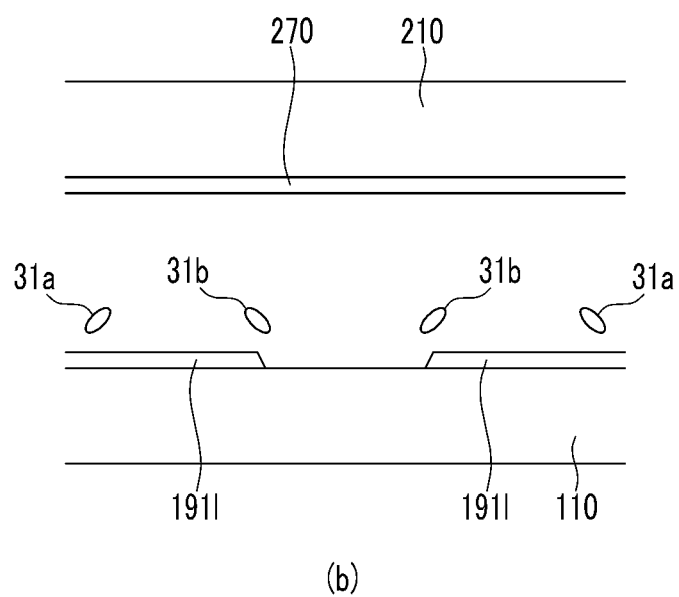

Alignment of the liquid crystal molecules 31 according to the end portion 91aa of the vertical stem portion 91a of the pixel electrode 191 will now be described. FIG. 6 is a schematic view of a liquid crystal direction in the basic region of the field generating electrodes of the liquid crystal display of FIG. 4 according to the exemplary embodiment described above, taken along the line VI-VI in FIG. 6(a), and for comparison purposes, a pixel electrode 191 without a portion 91a a, shown in FIG. 6(b).

Referring to (b) of FIG. 6, liquid crystal molecules 31a and 31b disposed over the second sub-pixel electrode 191l are arranged in a direction lying toward the center of the second sub-pixel electrode 191l from the edge of the second sub-pixel electrode 191l due to a fringe field formed by the edge of the second sub-pixel electrode 191l and the common electrode 270. Thus, alignment directions of the liquid crystal molecules 31a and 31b arranged at the left edge and the right edge of the second sub-pixel electrode 191l are different from each other and facing each other so that they collide with each other on the second sub-pixel electrode 191l and accordingly display quality may be decreased.

However, in the liquid crystal display of the present exemplary embodiment, as shown in (a) of FIG. 6, the first sub-pixel electrode 191h having portion 91a a and the second sub-pixel electrode 191l have a constant distance therebetween, and the first sub-pixel electrode 191h portion 91a a is disposed between the two edges of the second sub-pixel electrode 191l. In particular, an end portion 91a a of the vertical stem 91a of the first sub-pixel electrode 191h is extended between two adjacent sub-regions of the second sub-pixel electrode 191l. In addition, as previously described, the data voltage applied to the first sub-pixel electrode 191h is larger than the data voltage applied to the second sub-pixel electrode 191l.

Thus, like the liquid crystal molecules 31a arranged in the edge of the second sub-pixel electrode 191l disposed in the outer side of the pixel, the liquid crystal molecules 31b arranged in the edge adjacent to the first sub-pixel electrode 191h among the edges of the second sub-pixel electrode 191l are arranged so that they lay in a direction toward the center of the pixel area due to the electric field formed by the first sub-pixel electrode 191h arranged adjacent thereto. Accordingly, deterioration of display quality due to liquid crystal molecule collision that may occur in a portion where the first sub-pixel electrode 191h and the second sub-pixel electrode 191l are adjacent to each other can be prevented.

In addition, the second sub-pixel electrode 191l of the liquid crystal display according to the present exemplary embodiment includes a cutout 92 formed along an edge among the edges of the second sub-pixel electrode 191l, not adjacent to the first sub-pixel electrode 191h and disposed in an outer portion of the pixel area. The cutout 92 decreases the influence of the fringe field formed by the edge of the second sub-pixel electrode 191l, formed in the outer portion of the pixel area, and the common electrode 270. Thus inclination of the liquid crystal molecules toward a direction forming 90 degrees with the edge of the second sub-pixel electrode 191l can be prevented, so that transmittance deterioration and display quality deterioration that may occur in the edge of the pixel area can be prevented.

The first pixel electrode 191h of the liquid crystal display according to the exemplary embodiment includes a plurality of fine slits such that a stem portion and a plurality of branch portions extended from the stem portion are formed to form a plurality of domains without forming a cross-shaped cutout portion in the common electrode 270. In addition, the second pixel electrode 191l is formed in the shape of a plate, without a plurality of fine slits and branch portions such as in the first sub-pixel electrode 191h, such that a decrease of the aperture ratio can be reduced compared to a liquid crystal display in which fine branch portions are formed in both sub-pixel electrodes, and a cutout portion is formed along an edge of the second pixel electrode 191 such that an influence of a fringe field formed in the edge of the second pixel electrode 191l can be reduced, thereby preventing display quality deterioration at the edge of the pixel area.

A liquid crystal display according to another exemplary embodiment will be described with reference to FIG. 7 to FIG. 9.

Figure 7:
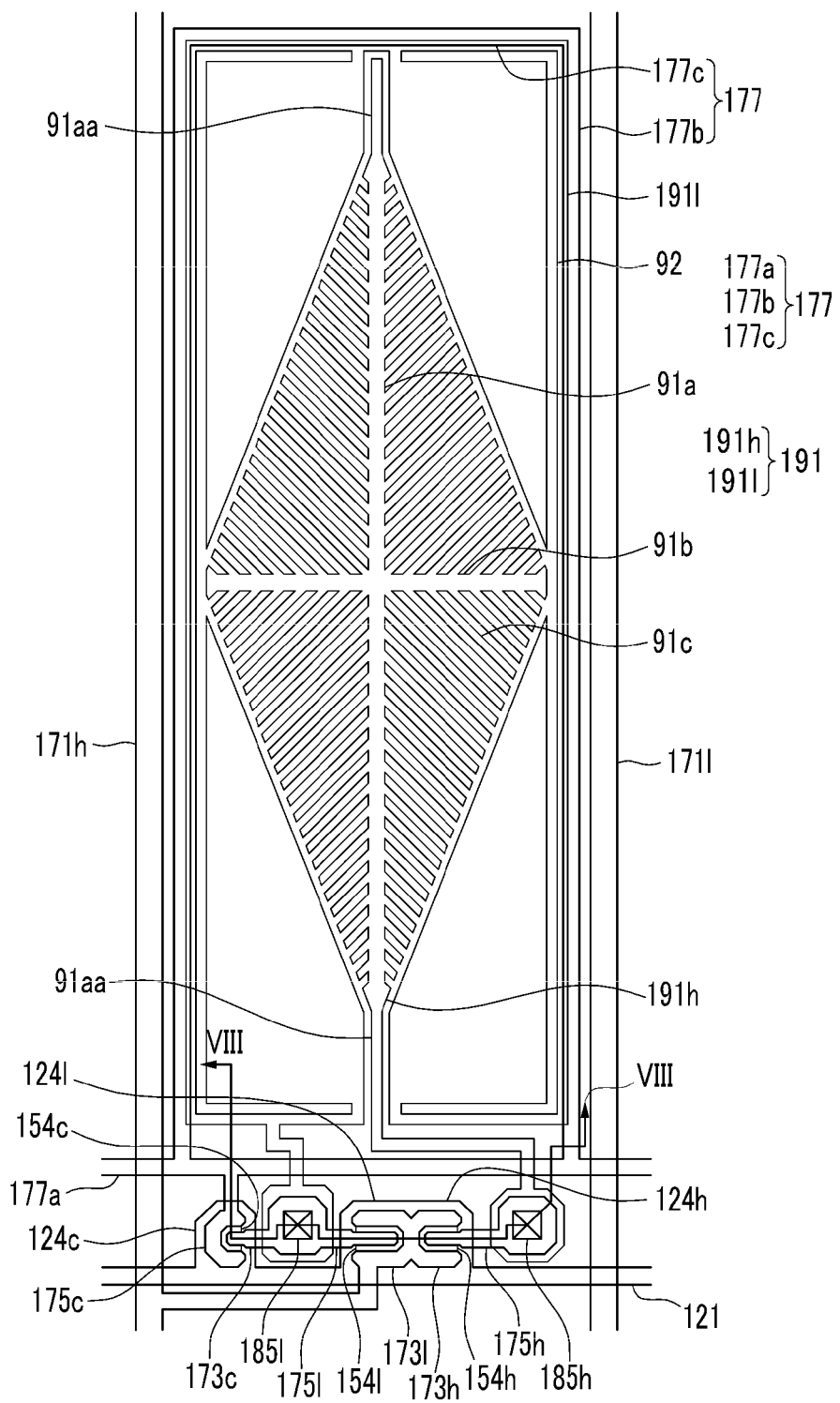
FIG. 7 is a layout view of a liquid crystal display according to another exemplary embodiment.
Figure 8:
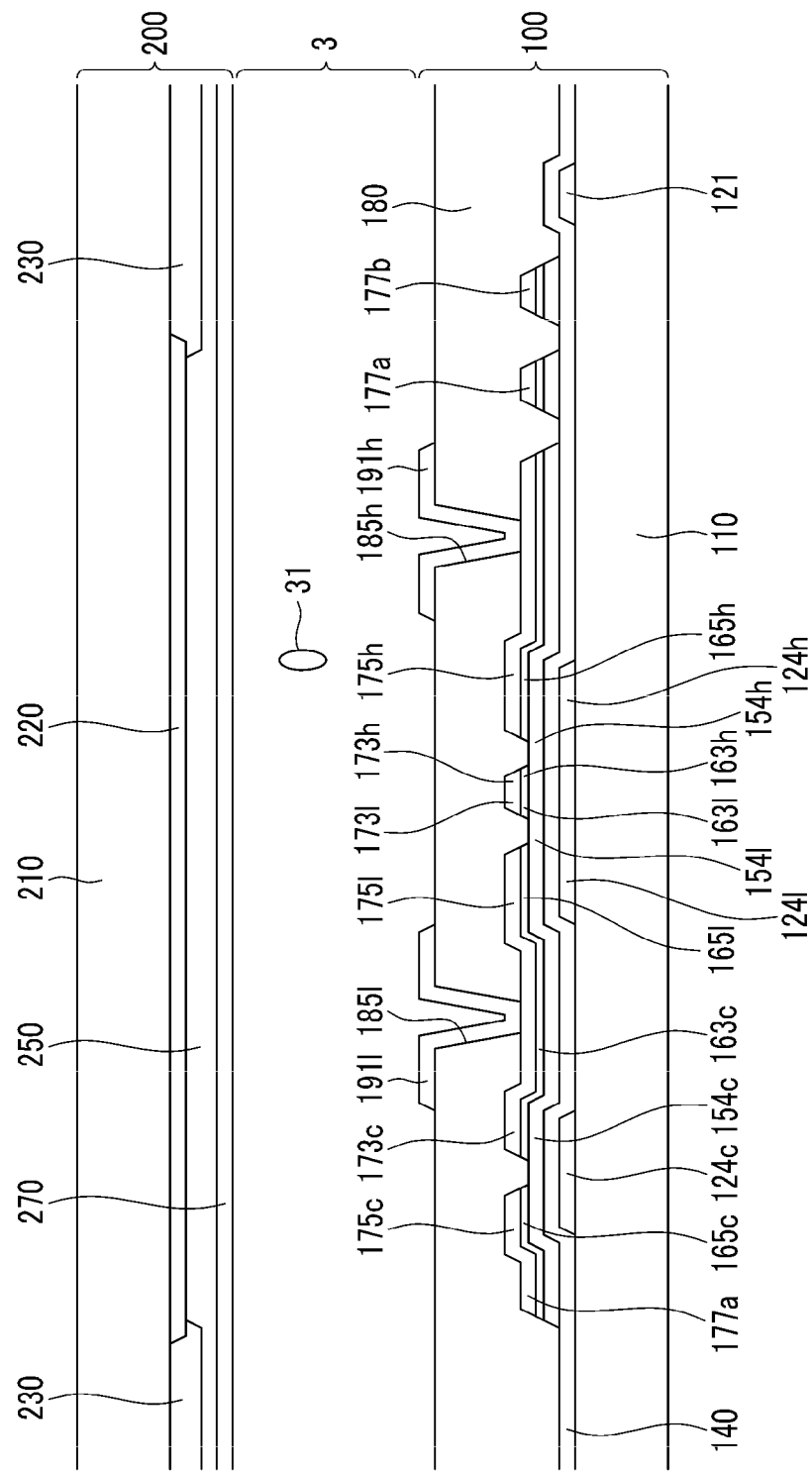
FIG. 8 is a cross-sectional view of the liquid crystal display of FIG. 7, taken along the line VIII-VIII.
Figure 9:
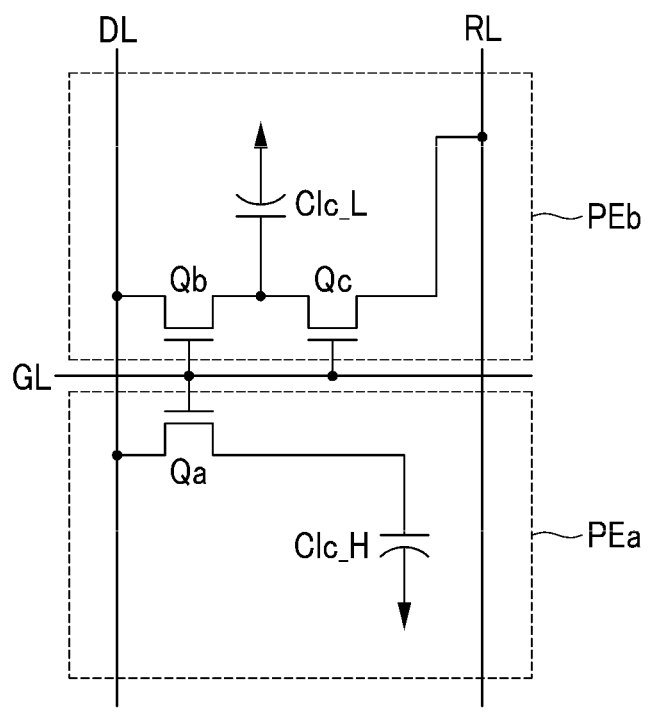
FIG. 9 is an equivalent circuit diagram of a pixel of an exemplary embodiment.

Referring to FIG. 7 to FIG. 9, the liquid crystal display according to the present exemplary embodiment is similar to the liquid crystal display according to the exemplary embodiments of FIG. 1 to FIG. 6, with the exception of the alignment of signal lines and a thin film transistor connected to first and second sub-pixel electrodes 191h and 191l.

First, referring to FIG. 9, in the liquid crystal display according to the present exemplary embodiment, each pixel includes a plurality of signal lines, a first switch Qa, a second switch Qb, a third switch Qc, a first liquid crystal capacitor Clc_H, and a second liquid crystal capacitor Clc_L, respectively connected to the plurality of signal lines, and the plurality of signal lines include a gate line GL transmitting a gate signal, a data line DL transmitting a data signal, and a reference voltage line RL transmitting a divided reference voltage.

The first switch Qa and the second switch Qb are respectively connected to the gate line GL and the data line DL, and the third switch Qc is connected to an output terminal of the second switch Qb and the reference voltage line RL.

As a three-terminal element of the thin film transistor, the first switch Qa, and the second switch Qb, a control terminal of each of the switches Qa and Qb is connected to the gate line GL and an input terminal thereof is connected to the data line DL, and an output terminal of the first switch Qa is connected to the first liquid crystal capacitor Clc_H and an output terminal of the second switch Qb is connected to output terminals of the second liquid crystal capacitor Clc_L and the third switch Qc.

The third switch Qc is also a three-terminal element of the thin film transistor, and a gate terminal thereof is connected to the gate line GL, an input terminal is connected to the second liquid crystal capacitor Clc_L, and an output terminal is connected to the reference voltage line RL.

When a gate-on signal Von is applied to the gate line GL, the first switch Qa, the second switch Qb, and the third switch Qc connected to the gate line GL are turned on. Accordingly, the data voltage applied to the data line DL is applied to a first sub-pixel electrode PEa and a second sub-pixel electrode PEb respectively through the turned on first and second switches Qa and Qb. In this case, the data voltage applied to the first sub-pixel electrode PEa and the data voltage applied to the second sub-pixel electrode PEb may be charged with the same value. However, according to the exemplary embodiment, the voltage applied to the second sub-pixel electrode PEb is divided through the third switch Qc coupled with the second switch Qb in series. Thus, the voltage applied to the second sub-pixel electrode PEb is smaller than the voltage applied to the first sub-pixel electrode PEa.

Accordingly, the voltage charged in the first liquid crystal capacitor Clc_H and the voltage charged in the second liquid crystal capacitor Clc_L are different from each other. Because the voltage charged in the first liquid crystal capacitor Clc_H and the voltage charged in the second liquid crystal capacitor Clc_L are different from each other, the inclination angle of liquid crystal molecules in the first sub-pixel and the inclination angle of liquid crystal molecules in the second sub-pixel are different from each other, and accordingly the two pixels have different luminance. Thus, an image viewed from the side may be maximally close in appearance to an image viewed from the front, and accordingly the side visibility may be improved by controlling the voltage that is charged in the first liquid crystal capacitor Clc_H and the voltage charged in the second liquid crystal capacitor Clc_L.

The liquid crystal display according to the present exemplary embodiment will be described in further detail with reference to FIG. 7 and FIG. 8.

The liquid crystal display according to the present exemplary embodiment includes a lower panel 100, an upper panel 200, a liquid crystal layer 3 provided between the two panels 100 and 200, and a pair of polarizers (not shown) respectively attached to outer sides of the panels 100 and 200. Here, the lower panel 100 and the upper panel 200 face each other.

First, the lower panel 100 will be described.

A gate line 121 is disposed on a first insulation substrate 110. The gate line 121 includes a first gate electrode 124h, a second gate electrode 124l, and a third gate electrode 124c.

A gate insulating layer 140 is disposed on the gate line 121. A first semiconductor 154h, a second semiconductor 154l, and a third semiconductor 154c are formed on the gate insulating layer 140.

A plurality of ohmic contacts 163h, 165h, 163l, 165l, 163c, and 165c are disposed on the first semiconductor 154h, the second semiconductor 154l, and the third semiconductor 154c.

A plurality of data lines 171h and 171l including a first source electrode 173h and a second source electrode 173l and data conductors 171h and 171l, 173c, 175h, 175l, and 175c including a first drain electrode 175h, a second drain electrode 175l, a third source electrode 173c, and a third drain electrode 175c are disposed on the ohmic contacts 163h, 165h, 163l, 165l, 163c, and 165c and the gate insulating layer 140.

The third drain electrode 175c includes an extension portion 177.

The data conductor, the semiconductor, and the ohmic contact may be simultaneously formed using one mask.

The first gate electrode 124h, the first source electrode 173h, and the first drain electrode 175h form a first thin film transistor Qa together with the first semiconductor 154h, and a channel of the thin film transistor is formed in a first semiconductor portion 154h between the first source electrode 173h and the first drain electrode 175h. Similarly, the second gate electrode 124l, the second source electrode 173l, and the second drain electrode 175l form a second thin film transistor Qb together with the second semiconductor layer 154l, and a channel of the thin film transistor is formed in a second semiconductor portion 154l between the second source electrode 173l and the second drain electrode 175l. A third gate electrode 124c, a third source electrode 173c, and a third drain electrode 175c form a third thin film transistor Qc together with the third semiconductor layer 154c, and a channel of the thin film transistor is formed in a semiconductor portion 154c between the third source electrode 173c and the third drain electrode 175c.

A passivation layer 180 is formed on the data conductors 171h and 171l, 173c, 175h, 175l, and 175c and the exposed semiconductors 154h, 154l, and 154c. The passivation layer 180 is formed of an inorganic insulator such as, for example, silicon nitride and silicon oxide. However, the passivation layer 180 may be formed of an organic insulator, and may have a flat surface. When the passivation layer 180 is formed of an organic insulator, the passivation layer 180 may have photosensitivity and a dielectric constant thereof may be less than about 4.0. The passivation layer 180 may have a dual-layer structure of a lower inorganic layer and an upper organic layer in order to prevent damage to the exposed semiconductors 154h, 154l, and 154c while maintaining the excellent insulating characteristic of the organic layer.

A plurality of contact holes 185h and 185l exposing the first and second drain electrodes 175h and 175l are formed in the passivation layer 180.

A pixel electrode 191 including a first sub-pixel electrode 191h and a second sub-pixel electrode 191l is formed on the passivation layer 180. The pixel electrode 191 may be formed of a transparent conductive material such as, for example, ITO or IZO, or a reflective metal such as, for example, aluminum, silver, chromium, or alloys thereof.

Each pixel electrode 191 includes a first sub-pixel electrode 191h and a second sub-pixel electrode 191l.

The overall shape of the first sub-pixel electrode 191h is a rhombus, and includes a vertical stem portion 91a, a horizontal stem portion 91b, and a fine branch portion 91c extended from the two stem portions 91a and 91b. The vertical stem portion 91a and the horizontal stem portion 91b are connected with each other, and the two stem portions 91a and 91b and the fine branch portion 91c are formed in a central portion of the first sub-pixel electrode 191h. The first sub-pixel electrode 191h is divided into a plurality of sub-regions with reference to a direction in which the fine branch portion 91c is extended with the stem portions 91a and 91b as a boundary. In further detail, the first sub-pixel electrode 191h of the liquid crystal display according to the present exemplary embodiment is divided into four sub-regions. The fine branch portion 91c is extended outward from the stem portions 91a and 91b in different directions in the four sub-regions.

The fine branch portion 91c forms an angle of about 45 degrees or 135 degrees with the gate line 121 or the horizontal stem portion 91b. In addition, the directions the fine branch portions 91c of two neighboring sub-regions extend may perpendicularly cross each other.

The width of each individual branch in the fine branch portion 91c and a distance between two neighboring fine branches 91c may be about 1 µm to 10 µm.

The second sub-pixel electrode 191l surrounds the first sub-pixel electrode 191h, and includes a plurality of sub-regions disposed at outer edges of the respective sub-regions of the first sub-pixel electrode 191l. The second sub-pixel electrode 191l may be divided into a plurality of sub-regions by a separation portion between the first sub-pixel electrode 191h and the second sub-pixel electrode 191l on one side and the edge of the second sub-pixel electrode 191l on the other. In further detail, the second sub-pixel electrode 191l of the liquid crystal display according to the present exemplary embodiment is divided into four sub-regions.

A cutout 92 is formed in the outer edges of the respective sub-regions of the second sub-pixel electrode 191l.

An end portion 91aa of the vertical stem portion 91a of the first sub-pixel electrode 191h is extended to a portion where the second sub-pixel electrode 191l is disposed.

The first sub-pixel electrode 191h and the second sub-pixel electrode 191l are separated by a constant distance, and the distance may be about 1 µm to 8 µm.

The entire figure of the pixel electrode 191 including the first sub-pixel electrode 191h and the second sub-pixel electrode 191l is a quadrangle.

The first sub-pixel electrode 191h and the second sub-pixel electrode 191l are physically and electrically connected with the first drain electrode 175h and the second drain electrode 175l through contact holes 185h and 185l, and receive data voltages from the first and second drain electrodes 175h and 175l. The data voltage applied to the second drain electrode 175l is partially divided through the third source electrode 173c, and thus the voltage applied to the second sub-pixel electrode 191l is smaller than the voltage applied to the first sub-pixel electrode 191h.

A lower alignment layer (not shown) is formed on the first sub-pixel electrode 191h and the second sub-pixel electrode 191l. The lower alignment layer may be a vertical alignment layer, and may include a photo-sensitive material.

The upper panel 200 will now be described.

A light blocking member 220 is formed on the second insulation substrate 210. The light blocking member 220 is also referred to as a black matrix and prevents light leakage.

A plurality of color filters 230 are formed on the substrate 210 and the light blocking member 220. The color filters 230 are mostly disposed in a region surrounded by the light blocking member 220, and may be extended along a pixel column including a plurality of pixels arranged in a column direction. Each color filter 230 may be one of three primary colors of red, green, and blue. Alternatively, each color filter 230 may display the primary colors of yellow, cyan, magenta, and the like, or may display a plurality of colors other than these primary colors.

As discussed above, at least one of the light blocking member 220 and the color filter 230 may be formed on the lower panel 100.

An overcoat 250 is formed on the color filter 230 and the light blocking member 220. The overcoat 250 may be made of an (organic) insulator, and prevents the color filter 230 from being exposed and provides a flat surface. The overcoat 250 may be omitted.

A common electrode 270 is formed on the overcoat 250.

Alignment layers (not shown) may be formed in both sides of the display panels 100 and 200, and they may be vertical alignment layers.

Polarizers (not shown) may be provided on the outer surfaces of the panels 100 and 200, and it is preferable that transmissive axes of the two polarizers may be orthogonal to each other and that one transmissive axis of the axes is parallel to the gate line 121. In the case of a reflective liquid crystal display, one of the two polarizers may be omitted.

The liquid crystal layer 3 includes liquid crystal molecules 31 having negative dielectric anisotropy. The liquid crystal layer 3 may include polymers. The liquid crystal molecules 31 may be aligned so that a long axis thereof is vertical (approximately perpendicular) with respect to the surface of the two display panels 100 and 200 in a state in which there is no electric field. The liquid crystal molecules 31 may be initially arranged to have a pretilt such that long axes of the liquid crystal molecules 31 are arranged in different directions in four sub-regions of the respective sub-pixel electrodes 191h and 191l by the fine branch portion 91c of the first sub-pixel electrode 191h and the edge of the second sub-pixel electrode 191l. Thus, each of the first and second sub-pixels has four sub-regions of which pretilt directions of liquid crystals are different from each other. Accordingly, incident light cannot pass through a crossed polarizer and is thus blocked in a state in which there is no electric field.

The first pixel electrode 191h of the liquid crystal display according to the exemplary embodiment includes a plurality of fine slits such that a stem portion and a plurality of branch portions extended from the stem portion are formed to form a plurality of domains without forming a cross-shaped cutout portion in the common electrode 270. In addition, the second pixel electrode 191l is formed in the shape of a plate, without a plurality of fine slits and branch portions such as in the first sub-pixel electrode 191h, such that a decrease of the aperture ratio can be reduced compared to a liquid crystal display in which fine branch portions are formed in both sub-pixel electrodes, and a cutout portion is formed along an edge of the second pixel electrode 191 such that an influence of a fringe field formed in the edge of the second pixel electrode 191l can be reduced, thereby preventing display quality deterioration at the edge of the pixel area.

Various features of the liquid crystal display according to the exemplary embodiment described with reference to FIG. 1 to FIG. 6 may be applicable to the liquid crystal display according to the present exemplary embodiment.

Figure 10:
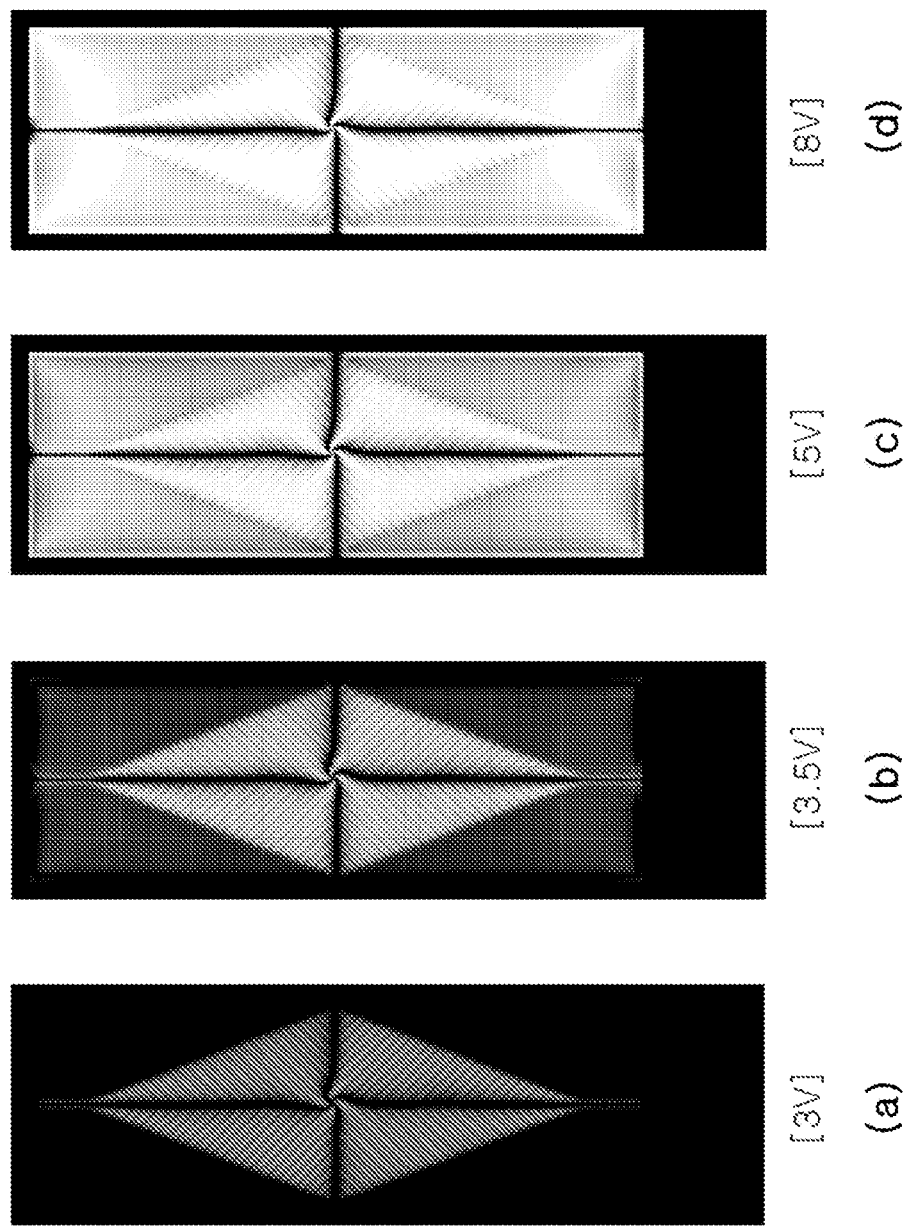
FIG. 10 shows transmittance of each voltage level of a liquid crystal display according to an experimental example.

Hereinafter, transmittance of each voltage of a liquid crystal display according to an experimental example will be described with reference to FIG. 10. FIG. 10 shows transmittance of each voltage of a liquid crystal display according to an experimental example.

Referring to FIG. 10, a first sub-pixel electrode 191h and a second sub-pixel electrode 191l have difference transmittance according to a variation of a driving voltage of one pixel of liquid crystal displays according to the exemplary embodiments described with reference to FIG. 1 to FIG. 9, and accordingly visibility can be enhanced. In addition, four sub-regions in the area occupied by each of the sub-pixel electrodes 191h and 191l can be clearly distinguished.

Figure 11:
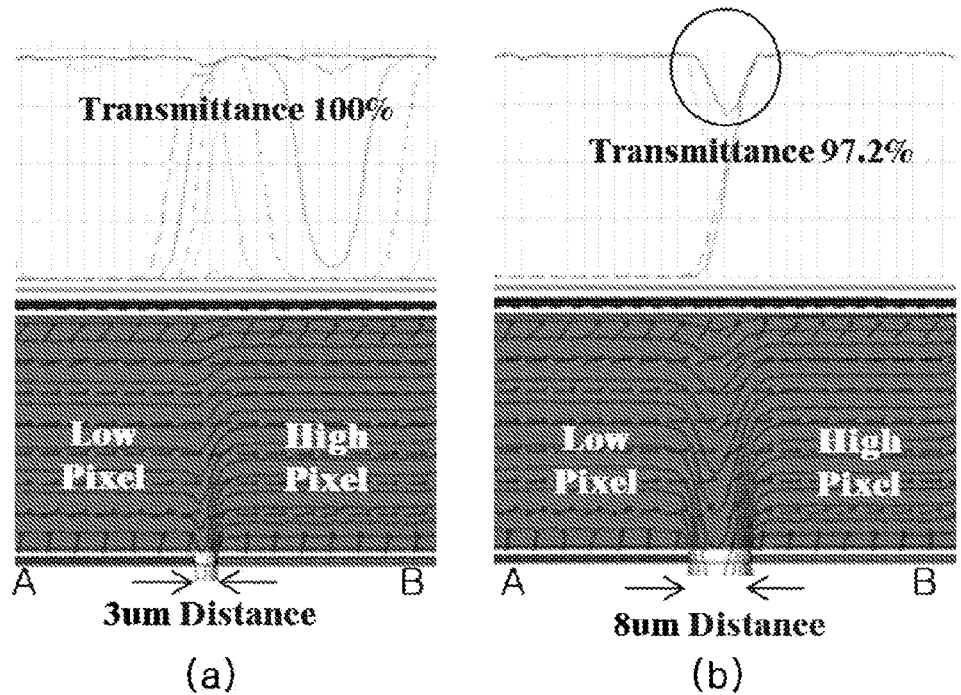
FIG. 11 shows an alignment and transmittance of liquid crystal directors of a liquid crystal display according to an experimental example.

Next, alignment of a director and transmittance of a liquid crystal display according to an experimental example will be described with reference to FIG. 11 and FIG. 12. FIG. 11 shows alignment of a liquid crystal director and transmittance of a liquid crystal display according to an experimental example, and FIG. 12 is a graph illustrating transmittance of the liquid crystal display according to the experimental example.

In the present experimental example, a distance between a first sub-pixel electrode 191h and a second sub-pixel electrode 191l is controlled for measurement of alignment and transmittance of a liquid crystal director. In (a) of FIG. 10, the distance between the first sub-pixel electrode 191h and the second sub-pixel electrode 191l was set to about 3 μm, and in (b) of FIG. 10, the distance between the first sub-pixel electrode 191h and the second sub-pixel electrode 191l was set to about 8 μm. Referring to FIG. 11, when the distance between the first sub-pixel electrode 191h and the second sub-pixel electrode 191l was set to be smaller than 8 μm, liquid crystal directors adjacent to an interface of the two sub-pixel electrodes had uniform alignment, and transmittance in the interface was insignificantly decreased.

Figure 12:
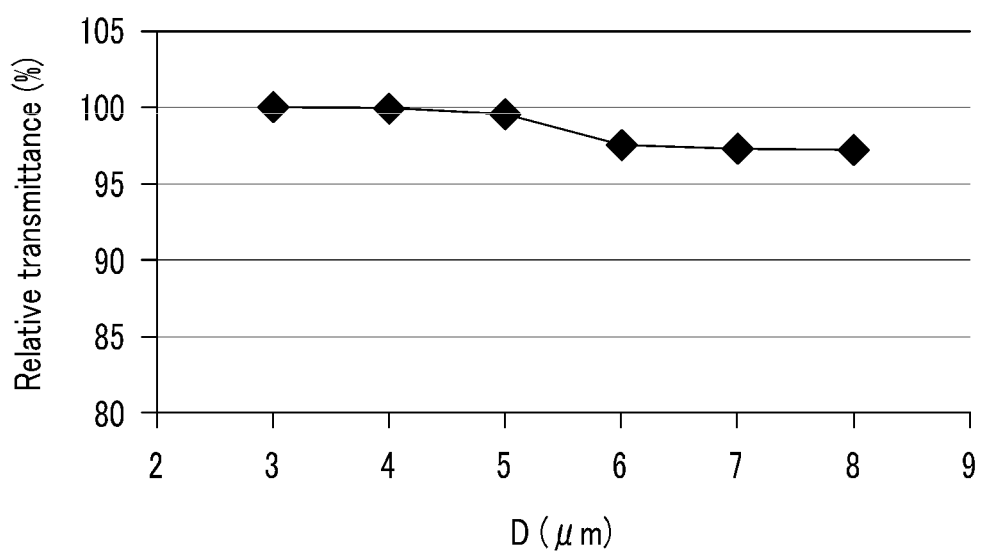
FIG. 12 is a graph showing transmittance of a liquid crystal display according to another experimental example.

Referring to FIG. 12, when a distance D between the first sub-pixel electrode 191h and the second sub-pixel electrode 191l was less than 8 μm, the transmittance decrease due to the distance D between the two sub-pixel electrodes 191h and 191l was insignificant, and accordingly, state transmittance was significantly high.

Thus, as in the exemplary embodiment, the liquid crystal molecules could be uniformly arranged and deterioration of transmittance could be prevented when the distance between the first sub-pixel electrode 191h and the second sub-pixel electrode 191l was set to be 1 μm to 8 μm.

Figure 13:
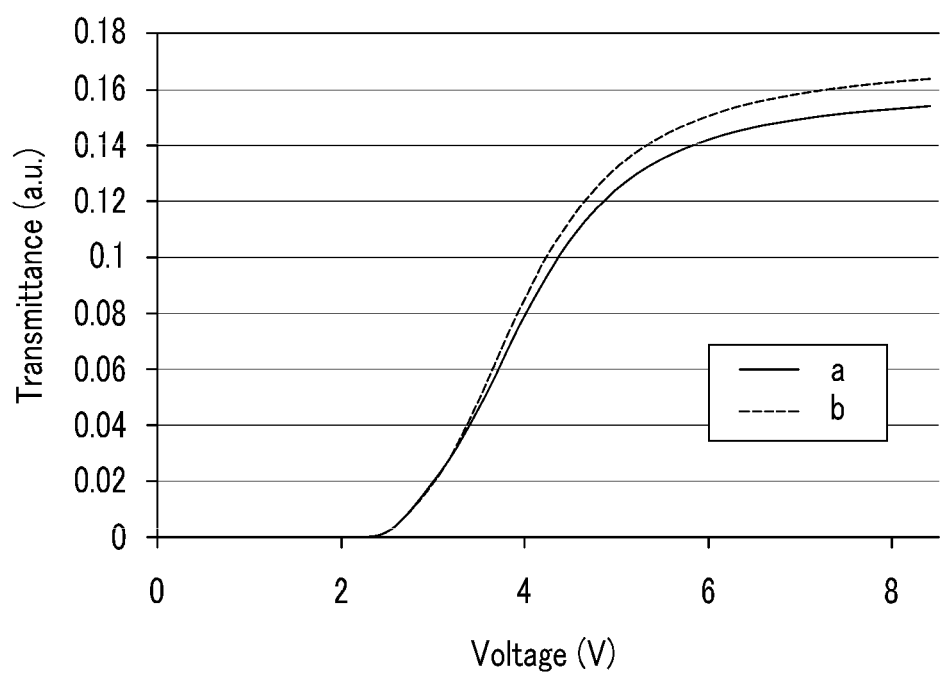
FIG. 13 is a graph showing a transmittance result of a liquid crystal display according to an experimental example.

Now, referring to FIG. 13, transmittance results of a liquid crystal display according to another experimental example will be described. FIG. 13 is a graph illustrating a transmittance result of the liquid crystal display according to the experimental example.

In the present experimental example, transmittance according to driving voltage is measured for case (a) and case (b), and the results are shown in FIG. 13. The case (a) is one in which both of the first and second sub-pixel electrodes 191h and 191l have stem portions and fine branch portions extended from the stem portions, and the case (b) is one in which the pixel electrode 191 is formed like the liquid crystal display according to the exemplary embodiments.

Referring to FIG. 13, the transmittance of the case (b) was higher on the whole than that of the case (a). As described, the liquid crystal display according to the exemplary embodiments has higher transmittance compared to a conventional liquid crystal display.

Figure 14A:
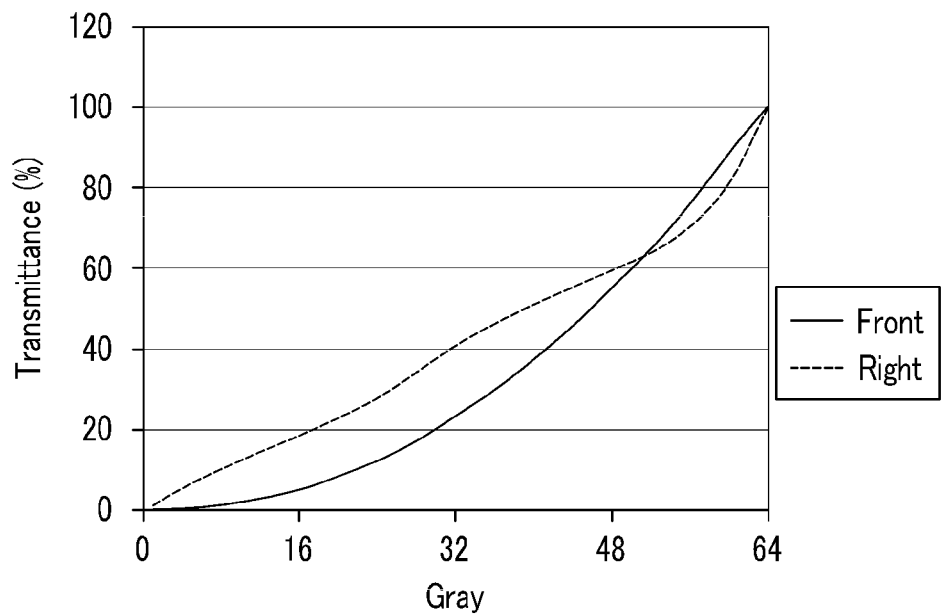
FIG. 14A and FIG. 14B are graphs showing a visibility result of a liquid crystal display according to another experimental example.
Figure 14B:
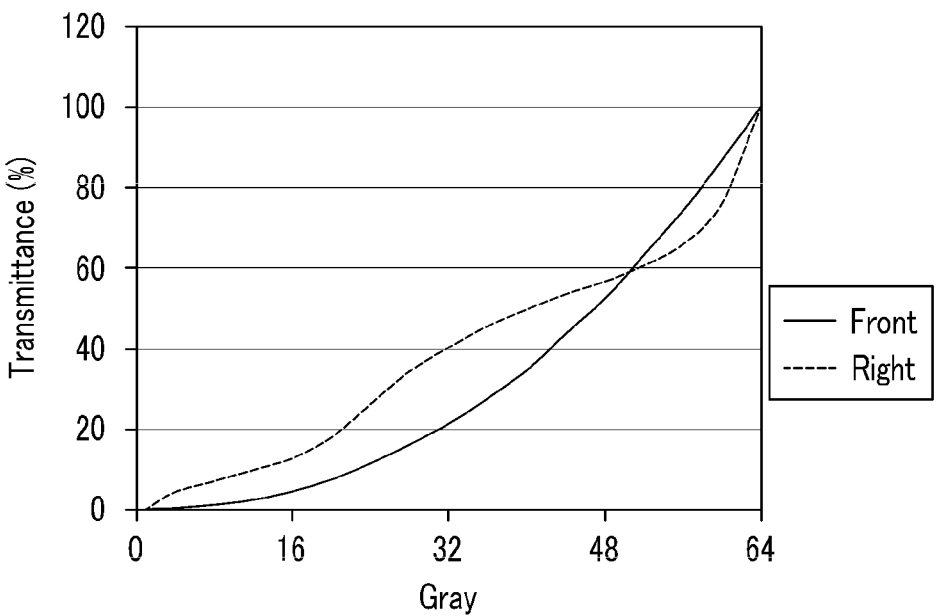

Next, a visibility result of a liquid crystal display according to another experimental example will be described with reference to FIG. 14A and FIG. 14B. FIG. 14A and FIG. 14B are graphs illustrating a visibility result of a liquid crystal display according to another experimental example. FIG. 14A shows transmittance according to grayscales from the front and right sides in a conventional liquid crystal display having a pixel electrode in which both of the sub-pixel electrodes have stem portions and fine branch portions extended from the stem portions, and FIG. 14B shows transmittance according to grayscales from the front and right sides in the liquid crystal display in which the pixel electrode 191 is formed according to the exemplary embodiments.

Comparing FIG. 14A and FIG. 14B, the transmittance difference between the side and the front of the liquid crystal display according to the exemplary embodiments was insignificant compared to the conventional liquid crystal display, and particularly, a transmittance difference between the side and the front in low grays was actually smaller than that of the conventional liquid crystal display. As described, compared to the conventional liquid crystal display, a difference between front visibility and side visibility of the liquid crystal display according to the exemplary embodiment is decreased so that the entire visibility of the liquid crystal display can be improved.

Figure 15:
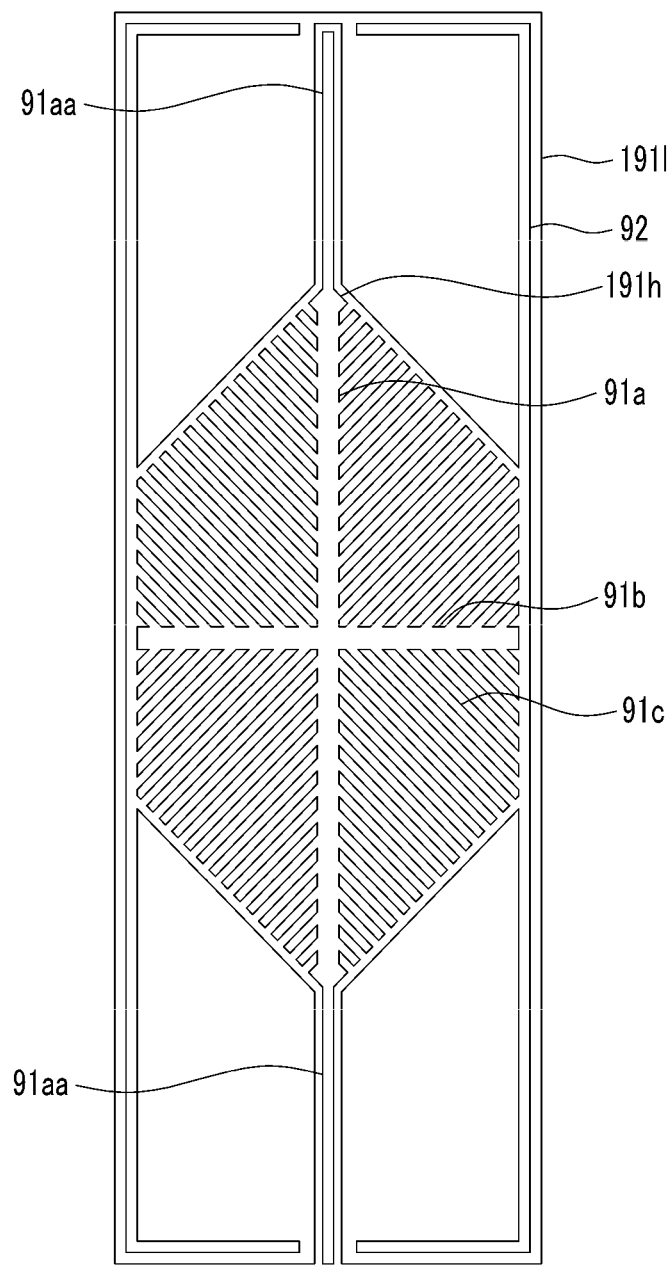
FIG. 15 is a top plan view of a basic region of a pixel electrode of a liquid crystal display according to an exemplary embodiment.

Hereinafter, a basic region of a pixel electrode of a liquid crystal display according to another exemplary embodiment will be described with reference to FIG. 15. FIG. 15 is a top plan view of a basic region of a pixel electrode of a liquid crystal display according to another exemplary embodiment.

Referring to FIG. 15, the basic region of the pixel electrode of the liquid crystal display according to the present exemplary embodiment is similar to the basic region of the pixel electrode of the liquid crystal display previously described with reference to FIG. 1 to FIG. 9, with the exception that a first sub-pixel electrode 191h is formed in the shape of a polygon such as hexagon and a portion where a fine branch portion 91c in a vertical stem portion 91a of the first sub-pixel electrode 191h has a longer length than other portions.

As described, the shapes of the first and second sub-pixel electrodes 191h and 191l of the liquid crystal display according to the exemplary embodiments can be variously modified. However, the first pixel electrode 191h of the liquid crystal display according to the exemplary embodiments includes a plurality of fine slits such that a stem portion and a plurality of branch portions extended from the stem portion are form a plurality of domains, without forming a cross-shaped cutout portion in the common electrode 270. In addition, the second pixel electrode 191l is formed in the shape of a plate, without a plurality of fine slits and branch portions such as in the first sub-pixel electrode 191h, such that a decrease of an aperture ratio can be reduced as compared to a liquid crystal display in which fine branch portions are formed in both sub-pixel electrodes, and a cutout portion is formed along an edge of the second pixel electrode 191 such that an influence of a fringe field formed at the edge of the second pixel electrode 191l can be reduced, thereby preventing display quality deterioration at the edge of the pixel area.

In addition, the first sub-pixel electrode 191h is disposed between two sub-regions of the second sub-pixel electrode 191l, and in particular, an end portion 91a of the vertical stem portion 91a of the first sub-pixel electrode 191h is extended along an edge of the second sub-pixel electrode 191l in upper and lower portions of the vertical center portion of a pixel area where two adjacent sub-regions of the second sub-pixel electrode 191 are close to each other, so that display quality deterioration due to collision of liquid crystal molecules that may occur in the interface of the sub-regions of the second sub-pixel electrode 191l can be prevented.

In addition, the second sub-pixel electrode 191l of the liquid crystal display according to the exemplary embodiments has a cutout portion 92. The cutout portion 92 is formed along an edge that is not adjacent to the first sub-pixel electrode 191h and which is disposed along the outer boundary of the pixel area among edges of the second sub-pixel electrode 191l. Because the cutout portion 92 reduces an influence of a fringe field formed by the edge of the second sub-pixel electrode 191l formed in the outer boundary of the pixel area and the common electrode 270, inclination of liquid crystal molecules toward a direction forming 90 degrees with the edge of the second sub-pixel electrode 191l in view of the horizontal surface can be prevented, thereby preventing deterioration of transmittance and deterioration of display quality that may occur at the edge of the pixel area.

The basic region of the pixel electrode of the liquid crystal device shown in FIG. 15 can be applied to all the liquid crystal displays according to the exemplary embodiments, described with reference to FIG. 1 to FIG. 6 and FIG. 7 to FIG. 9.

Figure 16:
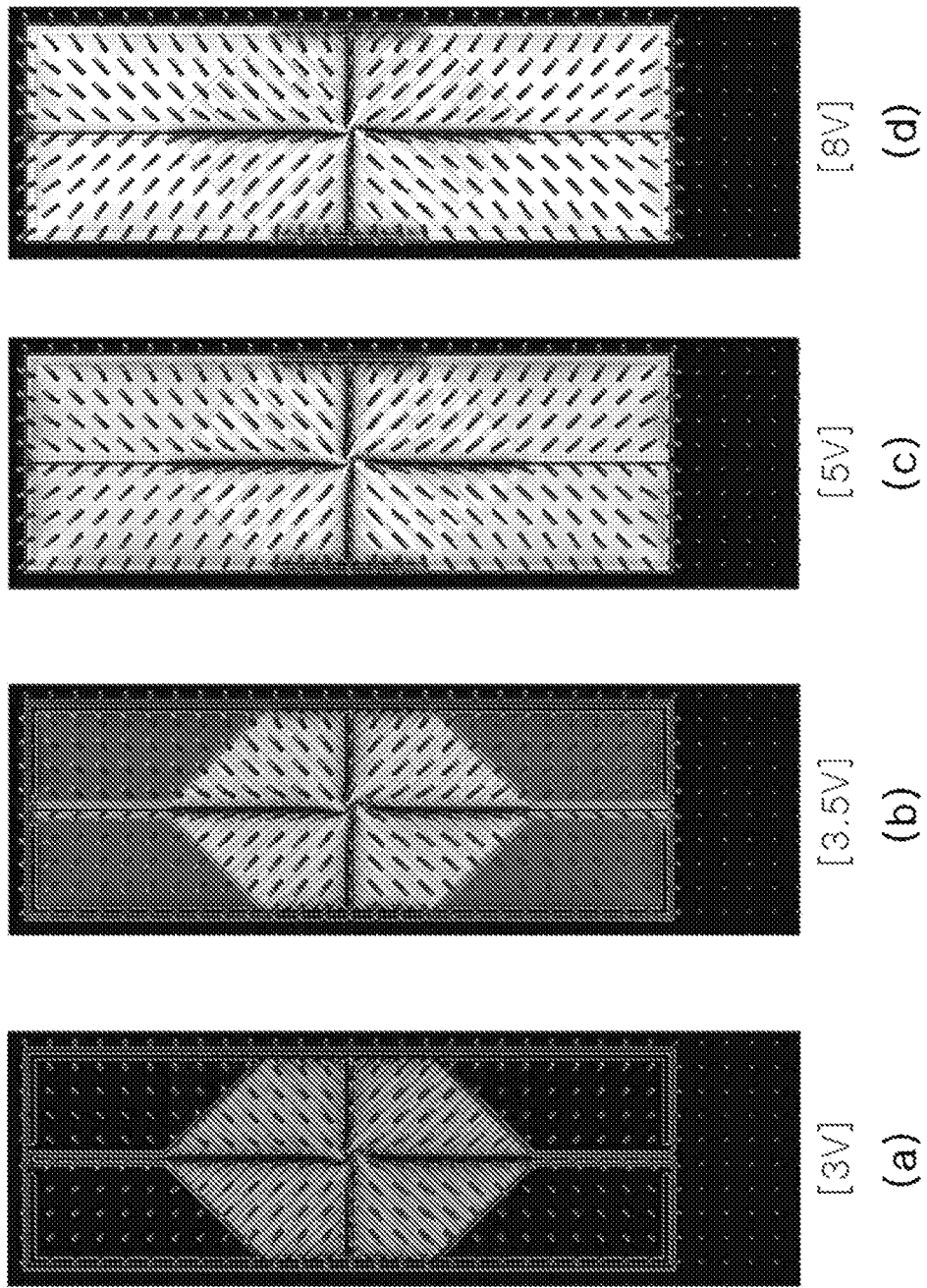
FIG. 16 shows transmittance for each voltage level of a liquid crystal display according to an experimental example.

Now, referring to FIG. 16, the transmittance according to a voltage of the liquid crystal display having the basic region of the pixel electrode shown in FIG. 15 will be described. FIG. 16 shows transmittance according to a voltage of a liquid crystal display according to another experimental example.

Referring to FIG. 16, similar to the experimental example of FIG. 10, the first sub-pixel electrode 191h and the second sub-pixel electrode 191l have different transmittance as a driving voltage applied to a pixel of the liquid crystal display was changed, and accordingly visibility is increased. In addition, four sub-regions in an area occupied by the respective sub-pixel electrodes 191h and 191l can be clearly distinguished.

As described, the first pixel electrode 191h of the liquid crystal display according to the exemplary embodiment includes a plurality of fine slits such that a stem portion and a plurality of branch portions extended from the stem portion are formed to form a plurality of domains, without forming a cross-shaped cutout portion in the common electrode 270. In addition, the second pixel electrode 191l is formed in the shape of a plate, without a plurality of fine slits and branch portions such as in the first sub-pixel electrode 191h, such that a decrease of the aperture ratio can be reduced as compared to a liquid crystal display in which fine branch portions are formed in both sub pixel electrodes, and a cutout portion is formed along an edge of the second pixel electrode 191 such that an influence of a fringe field formed in the edge of the second pixel electrode 191l can be reduced, thereby preventing display quality deterioration at the edge of the pixel area.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the disclosure, including the appended claims.

What is claimed is:

1. A liquid crystal display comprising:
a first substrate; and a pixel electrode including a first sub-pixel electrode and a second sub-pixel electrode formed at a distance from each other on the first substrate, wherein the first sub-pixel electrode comprises stem portions and a plurality of branch portions extended from the stem portions, and the second sub-pixel electrode surrounds the first sub-pixel electrode.

2. The liquid crystal display of claim 1, wherein the first sub-pixel electrode comprises a plurality of sub-regions where the plurality of branch portions are extended in different directions.

3. The liquid crystal display of claim 2, wherein the second sub-pixel comprises a plurality of sub-regions disposed outside of the plurality of sub-regions of the first sub-pixel electrode.

4. The liquid crystal display of claim 3, further comprising a second substrate facing the first substrate and a common electrode formed on the second substrate, wherein a voltage difference between the first sub-pixel electrode and the common electrode is different from a voltage difference between the second sub-pixel electrode and the common electrode.

5. The liquid crystal display of claim 4, wherein the voltage difference between the first sub-pixel electrode and the common electrode is greater than the voltage difference between the second sub-pixel electrode and the common electrode.

6. The liquid crystal display of claim 5, further comprising a liquid crystal layer injected between the first substrate and the second substrate and including a plurality of liquid crystal molecules, wherein, when no electric field is applied to the liquid crystal layer, the liquid crystal molecules are arranged in a direction perpendicular to surfaces of the first and second substrates.

7. The liquid crystal display of claim 6, wherein the second sub-pixel electrode comprises a cutout portion formed along an edge of the second sub-pixel electrode, the edge not being adjacent to the first sub-pixel electrode.

8. The liquid crystal display of claim 7, wherein the first sub-pixel electrode is disposed between the sub-regions of the second sub-pixel electrode, and the stem portion of the first sub-pixel electrode is extended to the edge of the second sub-pixel electrode.

9. The liquid crystal display of claim 8, wherein the first sub-pixel electrode and the second sub-pixel electrode are spaced apart by a distance of about 1 µm to 8 µm.

10. The liquid crystal display of claim 9, wherein a width of the plurality of branch portions of the first sub-pixel electrode and a distance between two adjacent branch portions among the plurality of branch portions are about 1 µm to 10 µm.

11. The liquid crystal display of claim 10, further comprising an alignment layer disposed on the first and second substrates, wherein the alignment layer includes a photosensitive material.

12. The liquid crystal display of claim 1, further comprising a second substrate facing the first substrate and a common electrode formed on the second substrate, wherein a voltage difference between the first sub-pixel electrode and the common electrode is different from a voltage difference between the second sub-pixel electrode and the common electrode.

13. The liquid crystal display of claim 12, wherein the voltage difference between the first sub-pixel electrode and the common electrode is greater than the voltage difference between the second sub-pixel electrode and the common electrode.

14. The liquid crystal display of claim 13, further comprising a liquid crystal layer injected between the first substrate and the second substrate and comprising a plurality of liquid crystal molecules, wherein, when no electric field is applied to the liquid crystal layer, the liquid crystal molecules are arranged in a direction perpendicular to surfaces of the first and second substrates.

15. The liquid crystal display of claim 14, wherein the second sub-pixel electrode comprises a cutout portion formed along an edge of the second sub-pixel electrode, not being adjacent to the first sub-pixel electrode.

16. The liquid crystal display of claim 15, wherein the second sub-pixel electrode comprises a plurality of sub-regions, the first sub-pixel electrode is disposed between the sub-regions of the second sub-pixel electrode, and the stem portion of the first sub-pixel electrode is extended to the edge of the second sub-pixel electrode.

17. The liquid crystal display of claim 16, wherein the first sub-pixel electrode and the second sub-pixel electrode are spaced apart by a distance of about 1 µm to 8 µm.

18. The liquid crystal display of claim 17, wherein a width of the plurality of branch portions of the first sub-pixel electrode and a distance between two adjacent branch portions among the plurality of branch portions are about 1 µm to 10 µm.

19. The liquid crystal display of claim 18, further comprising an alignment layer disposed on the first and second substrates, wherein the alignment layer includes a photosensitive material.

20. The liquid crystal display of claim 1, further comprising a second substrate facing the first substrate and a liquid crystal layer injected between the first and second substrates and including a plurality of liquid crystal molecules, wherein, when no electric field is applied to the liquid crystal layer, the liquid crystal molecules are arranged in a direction perpendicular to surfaces of the first and second substrates.

21. The liquid crystal display of claim 20, wherein the second sub-pixel electrode comprises a cutout portion formed along an edge of the second sub-pixel electrode, not being adjacent to the first sub-pixel electrode.

22. The liquid crystal display of claim 21, wherein the second sub-pixel electrode comprises a plurality of sub-regions, the first sub-pixel electrode is disposed between the sub-regions of the second sub-pixel electrode, and the stem portion of the first sub-pixel electrode is extended to the edge of the second sub-pixel electrode.

23. The liquid crystal display of claim 22, wherein the first sub-pixel electrode and the second sub-pixel electrode are spaced apart by a distance of about 1 µm to 8 µm.

24. The liquid crystal display of claim 23, wherein a width of the plurality of branch portions of the first sub-pixel electrode and a distance between two adjacent branch portions among the plurality of branch portions are about 1 µm to 10 µm.

25. The liquid crystal display of claim 24, further comprising an alignment layer disposed on the first and second substrates, wherein the alignment layer includes a photosensitive material.

26. The liquid crystal display of claim 1, wherein the second sub-pixel electrode comprises a cutout portion formed along an edge of the second sub-pixel electrode, not being adjacent to the first sub-pixel electrode.

27. The liquid crystal display of claim 26, wherein the second sub-pixel electrode comprises a plurality of sub-regions,
the first sub-pixel electrode is disposed between the sub-regions of the second sub-pixel electrode, and the stem portion of the first sub-pixel electrode is extended to the edge of the second sub-pixel electrode.

28. The liquid crystal display of claim 26, wherein the first sub-pixel electrode and the second sub-pixel electrode are spaced apart by a distance of about 1 μm to 8 μm.

29. The liquid crystal display of claim 28, wherein a width of the plurality of branch portions of the first sub-pixel electrode and a distance between two adjacent branch portions among the plurality of branch portions are about 1 μm to 10 μm.

30. The liquid crystal display of claim 29, further comprising an alignment layer disposed in the first and second substrates,
wherein the alignment layer includes a photosensitive material.

31. The liquid crystal display of claim 1, wherein the second sub-pixel electrode comprises a plurality of sub-regions,
the first sub-pixel electrode is disposed between the sub-regions of the second sub-pixel electrode, and the stem portion of the first sub-pixel electrode is extended to the edge of the second sub-pixel electrode.

32. The liquid crystal display of claim 31, wherein the first sub-pixel electrode and the second sub-pixel electrode are spaced apart by a distance of about 1 μm to 8 μm.

33. The liquid crystal display of claim 32, wherein a width of the plurality of branch portions of the first sub-pixel electrode and a distance between two adjacent branch portions among the plurality of branch portions are about 1 μm to 10 μm.

34. The liquid crystal display of claim 33, further comprising an alignment layer disposed on the first and second substrates,
wherein the alignment layer includes a photosensitive material.

35. The liquid crystal display of claim 1, wherein the first sub-pixel electrode and the second sub-pixel electrode are spaced apart by a distance of about 1 μm to 8 μm.

36. The liquid crystal display of claim 35, wherein a width of the plurality of branch portions of the first sub-pixel electrode and a distance between two adjacent branch portions among the plurality of branch portions are about 1 μm to 10 μm.

37. The liquid crystal display of claim 36, further comprising an alignment layer disposed in the first and second substrates,
wherein the alignment layer includes a photosensitive material.

38. The liquid crystal display of claim 1, wherein a width of the plurality of branch portions of the first sub-pixel electrode and a distance between two adjacent branch portions among the plurality of branch portions are about 1 μm to 10 μm.

39. The liquid crystal display of claim 38, further comprising an alignment layer disposed on the first and second substrates,
wherein the alignment layer includes a photosensitive material.

40. The liquid crystal display of claim 1, further comprising an alignment layer disposed in the first and second substrates,
wherein the alignment layer includes a photosensitive material.

* * * * *